A. T. RANDOLPH.
CINDER BLOWER TRAP FOR LOCOMOTIVES.
APPLICATION FILED FEB. 16, 1915.
1,150,704.
Patented Aug. 17, 1915.
2 SHEETS—SHEET 2.
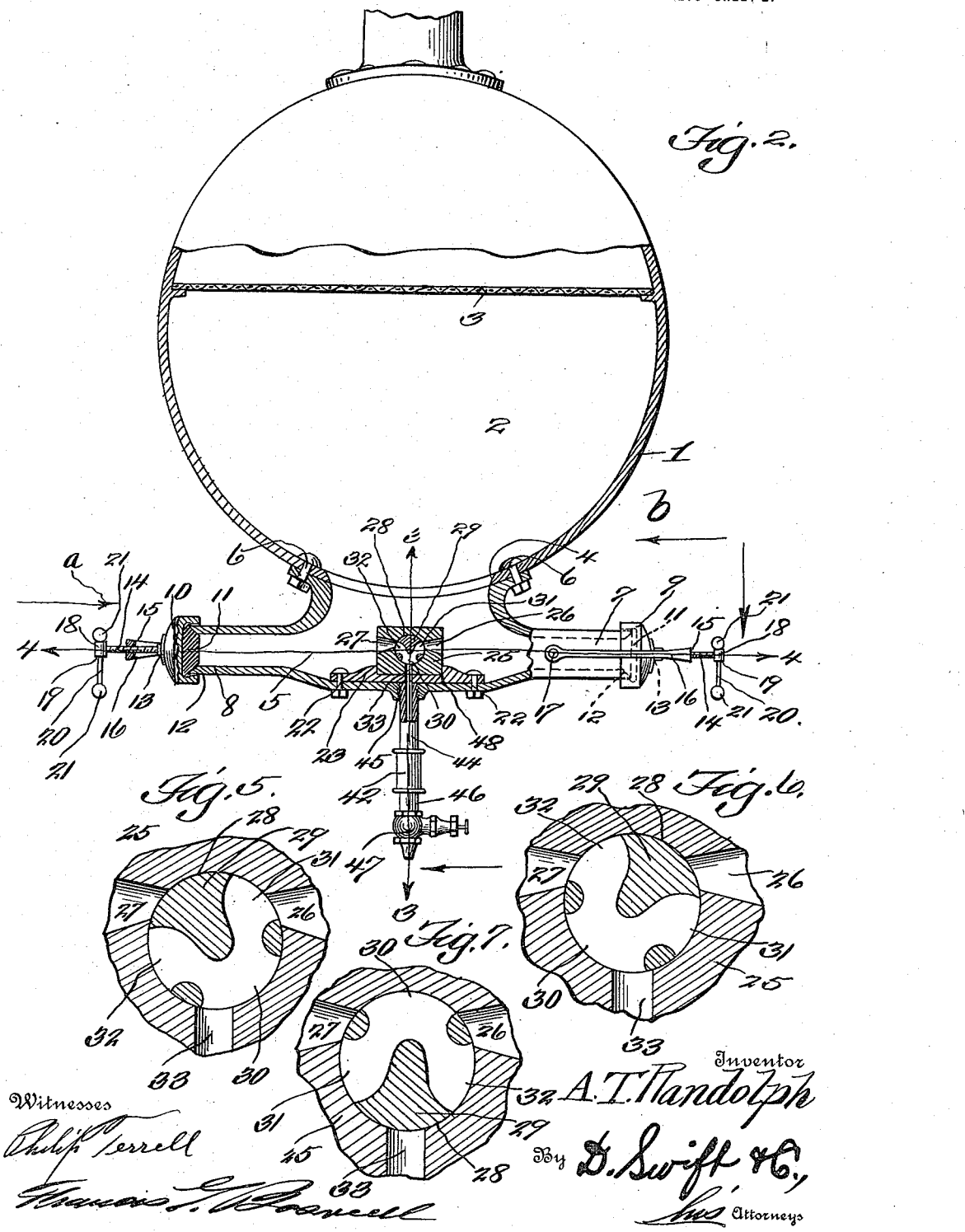

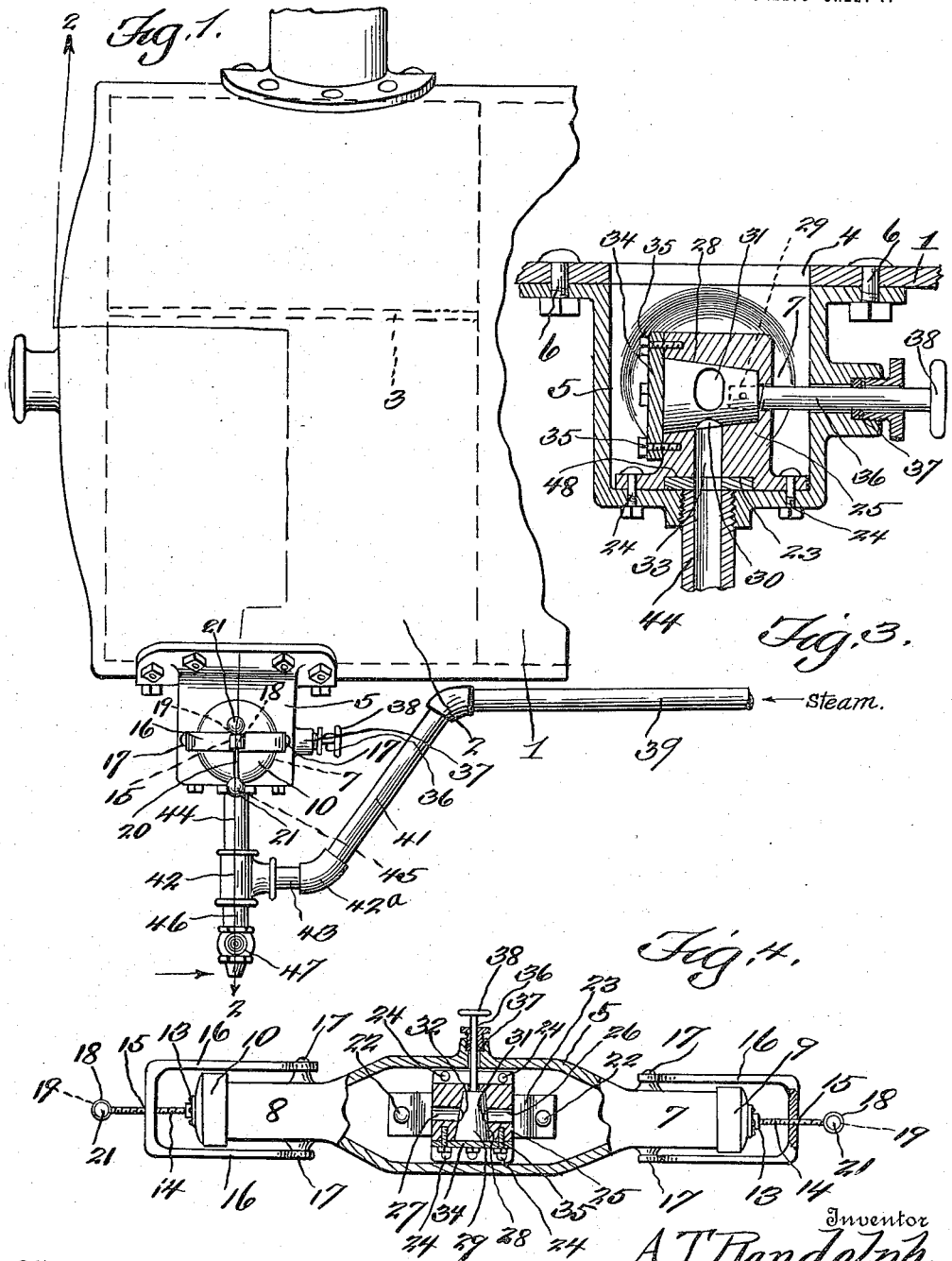

UNITED STATES PATENT OFFICE.

AUGUST T. RANDOLPH, OF DESLOGE, MISSOURI.

CINDER BLOWER-TRAP FOR LOCOMOTIVES.

1,150,704.

Specification of Letters Patent.

Patented Aug. 17, 1915.

Application filed February 16, 1915. Serial No. 8,690.

*To all whom it may concern:*

Be it known that I, AUGUST T. RANDOLPH, a citizen of the United States, residing at Desloge, in the county of St. Francois and State of Missouri, have invented a new and useful Cinder Blower - Trap for Locomotives; and I do hereby declare the following to be a full, clear, and exact description of the invention, such as will enable others skilled in the art to which it appertains to make and use the same.

This invention relates to a new and useful cinder blower trap for locomotives.

Heretofore, it has been found in removing cinders from the space in the front end of a boiler of a locomotive by blowing the cinders outwardly from the trap, they will be blown back upon the various moving parts of the locomotive, especially when the wind is blowing toward the locomotive, in which case the grit and the like will not only tend to injure the moving parts, but to a certain extent act to retard their movements. Very often this occurs subsequently to having cleaned the locomotive. The old method used for blowing the cinders comprises only one outlet, therefore they exit through this outlet regardless of which way the wind is blowing, and hence if the wind is blowing in the direction of the locomotive, the cinders are blown backwardly thereon.

As an object of the invention it is the aim to avoid such inconveniences and disadvantages, by providing a double outlet trap having a three way valve therein, so as to force steam outwardly through each individual outlet carrying the cinders therewith, or outwardly through both simultaneously, the valve being also constructed so as to cut off the steam from blowing through the trap. By this form of construction, if the wind is blowing toward the outlet extending to the left, the outlet to the right is opened, and the steam blows therethrough carrying the cinders with it, and if the wind is blowing toward the outlet (which extends to the right) the outlet to the left is opened, and the valve readjusted, whereby the cinders will be blown to the left and away from the locomotive, and vice versa.

In practical fields the details of construction may necessitate alterations, falling within the scope of what is claimed.

The invention comprises further features and combination of parts, as hereinafter set forth, shown in the drawings and claimed.

In the drawings, Figure 1 is a view in side elevation of a portion of the forward portion of the locomotive boiler, showing the improved cinder blower trap as applied thereto. Fig. 2 is a view partly in section and partly in elevation on line 2—2 of Fig. 1, showing the three way valve opened, so that the steam may be blown outwardly through both outlets, when their closures are opened. Fig. 3 is a sectional view on line 3—3 of Fig. 2, showing further the construction of the three way valve. Fig. 4 is a sectional view on line 4—4 of Fig. 2. Fig. 5 is an enlarged detail sectional view showing the position of the three way valve when blowing the steam and cinders to the right. Fig. 6 is an enlarged detail sectional view illustrating the position of the valve, when blowing the steam and cinders to the left. Fig. 7 is an enlarged detail sectional view of the three way valve, showing the same closed, thereby cutting off the supply of steam.

Referring more especially to the drawings, 1 designates the forward portion of the locomotive boiler, and beyond the usual flues or boiler tubes (not shown), a cinder space or compartment 2 is formed, and in which space the cinders deposit below the screening 3. The boiler adjacent this space 2 is constructed with an opening 4, and bolted to the boiler adjacent to and over the opening is a trap casing 5, the bolt being shown at 6. This trap casing about its central portion is rectangular in cross section, but the laterally extending outlet parts 7 and 8 are cylindrical in cross section, which are held normally closed by the flanged closures 9 and 10. These closures are provided with suitable packing gaskets 11, which engage the beveled seats 12, in order to insure a tight fit. Swiveled at 13 in any suitable manner to the closures are threaded rods 14, which are threaded at 15 in the transverse parts of the members 16, which are pivoted at 17 to the outlet extensions. The outer ends of the threaded rod 14 terminate in cylindrical members 18 having openings 19 through which the rods or bars 20 extend. These bars or rods 20 are provided with heads 21 at their ends, and after the rods 14 have been properly adjusted so as to draw the closures tight, the bars 20 are allowed to extend downwardly as shown in Fig. 2, thereby preventing the rod 14 from becoming jarred by the vibration of the locomotive. In other words, when the bars 20 are disposed as shown in Fig. 2, the heads 21 resting upon the tops of the members 18, cannot become so arranged as to overbalance the heads at the lower ends of the bars 20, in order to unscrew the rods 14. However, by manually manipulating the bars 20, the rods 14 may be unscrewed, and the closures opened. Bolted at 22 upon the interior of the trap casing to its lower portion is a bearing plate 23, arching which and likewise bolted to the trap casing as at 24 is a valve casing 25 having laterally extending outlet ports 26 and 27 opening in the direction with the outlet extensions, as clearly shown in Fig. 2. This valve casing 25 is constructed with a tapering chamber 28, for the reception of a correspondingly tapered three way valve 29 having ports 30, 31 and 32. The port 30 at times is designed to register with the steam inlet duct 33, while the ports 31 and 32 are designed to coöperate with the ports 26 and 27. A plate 34 bolted at 35 to the casing 25 acts to hold the valve 29 in place. The valve 29 is provided with the usual valve stem 36 extending through a suitable packing box or gland 37, and is provided with a hand wheel 38 whereby the valve may be adjusted. A pipe 39 is provided, and which receives steam from any suitable source (not shown) on the locomotive and is provided with a downwardly inclined portion 41, which is connected to a T-fitting 42 by means of the unions 42ª and 43, so as to allow steam to pass through the short pipe 44, and thence into the trap. The lower end of the short pipe 44 threads into the fitting 42, and its upper end threads at 45 into the trap casing and communicates with the steam inlet port 30. To the lower portion of the T-fitting a pipe 46 is threaded, which is provided with a suitable drain or blower valve cock 47, which is employed for draining or blowing off an over-supply of steam. Where the valve casing arches the plate 23, the plate 23 is recessed at 48 as shown in Fig. 2, to receive the valve casing.

If the wind is blowing toward the locomotive boiler as indicated by the arrow $a$ (which would blow particles back upon the mechanism of the locomotive), the closure 9 is opened, and then the three way valve 29 is adjusted as shown in Fig. 5, thereby allowing the steam to blow outwardly through the outlet extension 7 of the trap, so as to blow the cinders and the like from the space 2 and the trap casing outwardly through and away from the outlet extension 7. If the wind is blowing in the opposite direction, as indicated by the arrow $b$, the closure 10 is first removed, and the three way valve adjusted as shown in Fig. 6, in which case the steam will blow off and outwardly through the extension 8, carrying the cinders and the like with it and away from the locomotive. However, if the wind is blowing directly toward the front end of the locomotive boiler alined therewith, the three way valve may be adjusted as shown in Fig. 2, and both closures 9 and 10 opened, in which case the steam may blow off the cinders in opposite directions. When it is not desired to blow off the steam and the cinders, the three way valve may be closed as shown in Fig. 7, thereby closing the port 33 and cutting off the steam supply. If there is an oversupply of steam in the steam dome (not shown) the drain or blow off valve cock 47 may be opened.

The invention having been set forth, what is claimed as new and useful is:—

1. In combination with a locomotive boiler having a cinder depositing space and an opening adjacent the space, a cinder trap casing bolted to the boiler over the opening and having outlet extensions extending in opposite directions, closures therefor, a steam supply pipe connected to the trap casing, and a three way valve located in the trap casing in communication with the supply pipe for blowing off steam and the cinders through one or the other, or both of the outlet extensions.

2. In combination with a locomotive boiler having a cinder depositing space and an opening adjacent the space, a cinder trap casing bolted to the boiler over the opening and having outlet extensions extending in opposite directions, closures therefor, a steam supply pipe connected to the trap casing, and a three way valve located in the trap casing in communication with the supply pipe for blowing off steam and the cinders through one or the other, or both of the outlet extensions, means for detachably clamping the closures in place.

3. In combination with a locomotive boiler having a cinder depositing space and an opening adjacent the space, a cinder trap casing bolted to the boiler over the opening and having outlet extensions extending in opposite directions, closures therefor, a steam supply pipe connected to the trap casing, a plate having a recess secured in the bottom of the trap casing, a three way valve casing arching the plate and arranged in the recess thereof and secured to the bottom of the trap casing, said valve casing being in communication with the steam supply pipe, and a three way valve in the valve casing coöperating with the three ways of the valve casing, so as to blow off cinders and steam through one or the other of the outlet extension, or through both simultaneously.

In testimony whereof I have signed my name to this specification in the presence of two subscribing witnesses.

GUS RANDOLPH.

Witnesses:
E. W. WESCOUT,
A. P. MACKLEY.

Copies of this patent may be obtained for five cents each, by addressing the "Commissioner of Patents, Washington, D. C."